US011288959B2

(12) United States Patent
Zack

(10) Patent No.: US 11,288,959 B2
(45) Date of Patent: Mar. 29, 2022

(54) ACTIVE LANE MARKERS HAVING DRIVER ASSISTANCE FEEDBACK

(71) Applicant: Robert Bosch GmbH, Stuttgart (DE)

(72) Inventor: Steven Zack, Essex, CT (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 43 days.

(21) Appl. No.: 16/759,899

(22) PCT Filed: Oct. 24, 2018

(86) PCT No.: PCT/EP2018/079096
§ 371 (c)(1),
(2) Date: Apr. 28, 2020

(87) PCT Pub. No.: WO2019/086301
PCT Pub. Date: May 9, 2019

(65) Prior Publication Data
US 2021/0183246 A1    Jun. 17, 2021

Related U.S. Application Data

(60) Provisional application No. 62/579,440, filed on Oct. 31, 2017.

(51) Int. Cl.
*G08G 1/09* (2006.01)
*G05D 1/02* (2020.01)
(Continued)

(52) U.S. Cl.
CPC ............ *G08G 1/0968* (2013.01); *E01F 9/30* (2016.02); *E01F 9/40* (2016.02); *E01F 9/50* (2016.02);
(Continued)

(58) Field of Classification Search
CPC .. G08G 1/0968; G08G 1/0967; G08G 1/0116; G08G 1/0133; G08G 1/0145; G08G 1/048; G08G 1/087; G08G 1/0965; G05D 1/02; G05D 1/00; G05D 1/0276; G05D 1/0289
See application file for complete search history.

(56) References Cited

U.S. PATENT DOCUMENTS 5,289,183 A  *  2/1994  Hassett ................. G01S 13/765
                                                      340/905
5,839,816 A      11/1998  Varga et al.
(Continued)

FOREIGN PATENT DOCUMENTS

| CN | 200978396 | 11/2006 |
|---|---|---|
| CN | 200978396 | 11/2007 |

(Continued)

OTHER PUBLICATIONS

PCT International Search Report for PCT/EP2018/079096.

*Primary Examiner* — Tan Q Nguyen
(74) *Attorney, Agent, or Firm* — David Kovacek; Maginot, Moore & Beck LLP

(57) ABSTRACT

A system of active lane markers in a roadway, the active lane markers comprising sensors, transmitters and receivers to monitor the status of the roads and provide vehicle guidance to vehicles in response to analysis of sensor data.

17 Claims, 4 Drawing Sheets

(51) Int. Cl.
  *G08G 1/0968* (2006.01)
  *E01F 9/30* (2016.01)
  *E01F 9/40* (2016.01)
  *E01F 9/50* (2016.01)
  *G05D 1/00* (2006.01)
  *G08G 1/0967* (2006.01)
  *E01F 9/582* (2016.01)
  *G08G 1/16* (2006.01)

(52) U.S. Cl.
  CPC ......... *G05D 1/0027* (2013.01); *G05D 1/0289* (2013.01); *G08G 1/0967* (2013.01); *E01F 9/582* (2016.02); *G05D 2201/0213* (2013.01); *G08G 1/166* (2013.01)

(56) References Cited

U.S. PATENT DOCUMENTS

| | | | | |
|---|---|---|---|---|
| 7,817,064 | B2 * | 10/2010 | Nishida | G08G 1/096783 340/905 |
| 8,174,374 | B2 | 5/2012 | Yim et al. | |
| 8,704,676 | B2 | 4/2014 | Hawkes et al. | |
| 8,825,357 | B2 | 9/2014 | Van de Velde | |
| 9,168,924 | B2 | 10/2015 | Lee et al. | |
| 9,460,618 | B1 | 10/2016 | Soltesz et al. | |
| 9,702,098 | B1 * | 7/2017 | King | G08G 1/0116 |
| 9,720,411 | B2 * | 8/2017 | Crombez | B60W 30/12 |
| 10,783,779 | B1 * | 9/2020 | Meyer | G08G 1/162 |
| 2006/0193691 | A1 * | 8/2006 | Gonzalez | E01F 9/559 404/15 |
| 2007/0041785 | A1 | 2/2007 | Raaijmakers et al. | |
| 2008/0216367 | A1 | 9/2008 | Van Der Poel | |
| 2009/0005929 | A1 | 1/2009 | Nakao et al. | |
| 2010/0207787 | A1 * | 8/2010 | Catten | G08G 1/096716 340/905 |
| 2011/0035140 | A1 * | 2/2011 | Candy | G08G 1/052 701/119 |
| 2013/0038461 | A1 * | 2/2013 | Hawkes | E01F 9/559 340/815.4 |
| 2013/0063282 | A1 * | 3/2013 | Baldwin | B61L 29/282 340/941 |
| 2013/0253753 | A1 | 9/2013 | Burnette et al. | |
| 2016/0076207 | A1 | 3/2016 | Moran et al. | |
| 2016/0132705 | A1 | 5/2016 | Kovarik et al. | |
| 2018/0136332 | A1 * | 5/2018 | Barfield, Jr | G06T 7/70 |
| 2018/0233047 | A1 * | 8/2018 | Mandeville-Clarke | B60W 30/00 |

FOREIGN PATENT DOCUMENTS

| | | |
|---|---|---|
| CN | 201051307 | 5/2008 |
| DE | 202016002407.9 | 2/2017 |
| GB | 2076042 | 5/1981 |
| NL | 1019074 | 4/2003 |
| UA | 109640 | 8/2016 |
| WO | 99/06636 | 2/1999 |
| WO | 2011158107 | 12/2011 |
| WO | 2017017040 | 2/2017 |

* cited by examiner

ACTIVE LANE MARKERS HAVING DRIVER ASSISTANCE FEEDBACK

CROSS-REFERENCE TO RELATED APPLICATIONS

This application is a 35 U.S.C. § 371 National Stage Application of PCT/EP2018/079096 filed on Oct. 24, 2018, which claims the benefit of U.S. Provisional Application No. 62/579,440, filed on Oct. 31, 2017, the disclosures of which are herein incorporated by reference in their entirety.

TECHNICAL FIELD

This disclosure relates to the field of driver assisted motor vehicles and the applications thereof to improving traffic safety conditions.

BACKGROUND

An Advanced Driver Assistance System (ADAS) of a vehicle provides functions to enhance the safety of operating the vehicle. The ADAS may utilize data pertaining to driving conditions, the status of the passengers or the surrounding traffic conditions to provide the driver with additional information, warning indicators, or augmented control of the vehicle.

Prior ADAS implementations have utilized environmental sensors, cameras, and self-contained vehicle functions to adjust vehicle operation in response to driving conditions. ADAS-supported vehicles could advantageously benefit from environments designed to provide active safety feedback in response to driving conditions. Such active environments may enhance the safety of passengers by providing additional data to ADAS-supported vehicles.

SUMMARY

One aspect of this disclosure is directed to a vehicle guidance system for providing active feedback to ADAS-supported vehicles. The vehicle guidance system is comprised of a control center having a processor for performing traffic analysis, a number of active lane marker devices, and a number of vehicle receivers. The active lane marker devices provide conventional passive lane marker functionality by providing visual indication of the lanes in a roadway, while also providing additional functions providing driving and traffic conditions to the vehicle guidance system. The vehicle receivers are configured to receive ADAS-supported guidance signals from the active lane markers that correspond to the results of the traffic analysis performed by the control center.

In some embodiments of the system, the vehicle receivers may not be included as a part of the system. Instead, in such embodiments, the vehicle receivers may be implemented as a permanent component of a vehicle.

A further aspect of this disclosure is an active lane marker device having a number of sensors operable to monitor driving conditions, a control transmitter operable to transmit the driving conditions to a traffic analysis processor, a control receiver operable to receive data from the traffic analysis processor, and a vehicle transmitter operable to transmit guidance data to vehicles within a range of the active lane marker device.

Some embodiments of the active lane marker device may further comprise a heating element operable to prevent formation of ice on an exposed surface of the active lane marker device.

Some embodiments of the active lane marker device may further comprise a solar panel operable to provide solar power to the active lane marker device.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
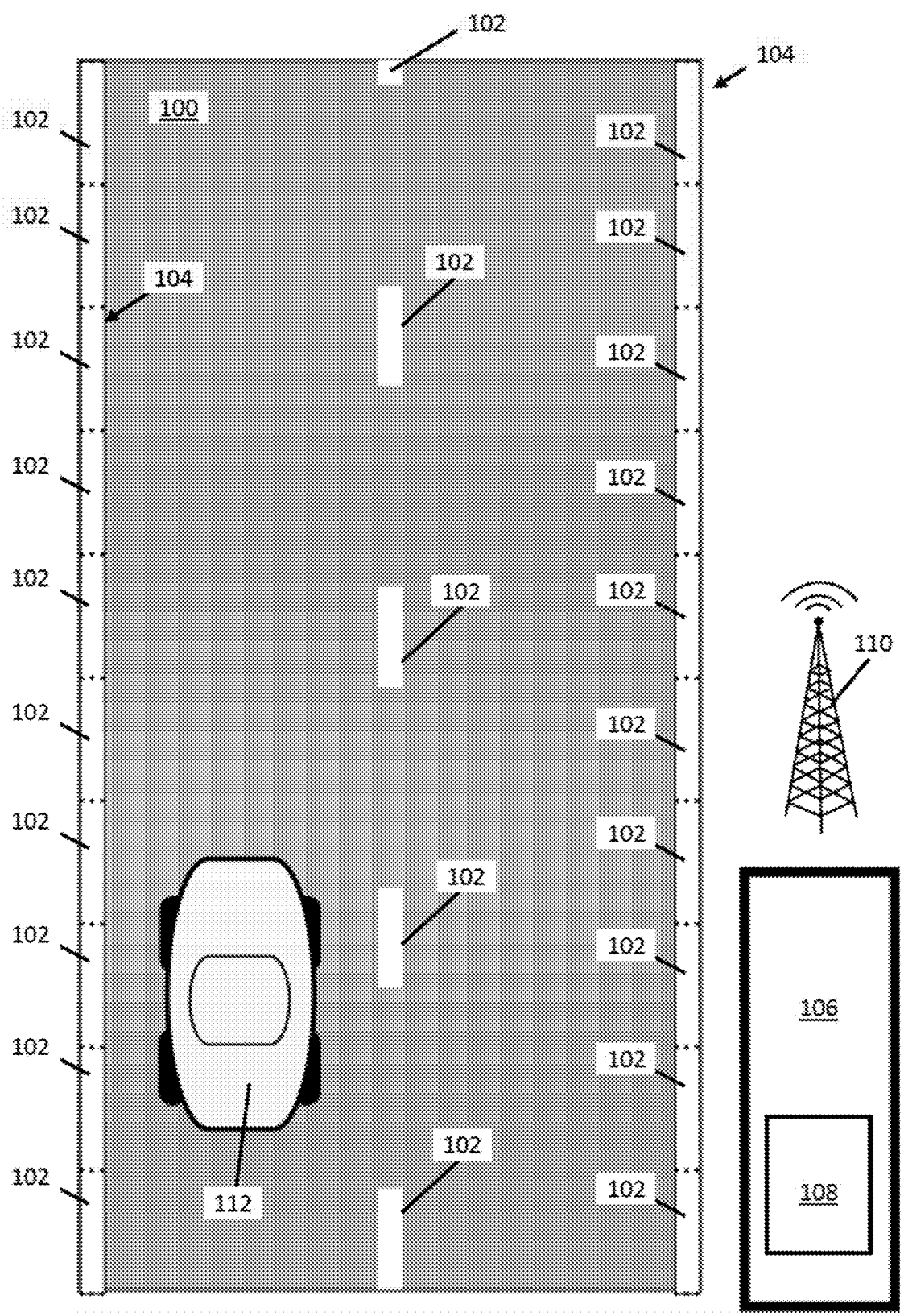
FIG. 1 is a diagrammatic view of a vehicle guidance system.

FIG. 1 shows a diagrammatic view of a vehicle guidance system according to one embodiment of the teachings herein. The system is implemented for use on a roadway 100. The roadway 100 is comprised of lanes delineated by a number of lane markings, the lane marking comprising active lane markers 102 and outer lane lines 104. Active lane markers 102 each comprise a number of sensors, a data transmitter, and a data receiver. The shoulder of roadway 100 and the driving surface are distinguished by the outer lane lines 104 on either edge of the driving surface of roadway 100. The outer lane lines 104 may comprise a series of additional active lane markers 102, but given visual continuity with conventional paint between the active portions thereof. For purposes of describing the embodiment herein, references to active lane markers 102 shall include the active lane markers embodied within outer lane lines 104. Other embodiments of the system may comprise other embodiments of outer lane lines 104, such as conventional passive paint lines. In some embodiments, outer lanes 104 may comprise entirely-active embodiments, or may comprise additional active lane markers arranged in the same manner as active lane markers 102. In other embodiments featuring embodiments of roadway 100 having more than two lanes, multiple series of active lane markers 102 may be disposed between outer lane lines 104.

The system further comprises a control center 106 having a traffic analysis processor 108 and a control center transceiver 110. Active lane markers 102 are in operable communication with traffic analysis processor 108 via control center transceiver 110. Active lane markers 102 are configured to monitor driving conditions of roadway 100 and generate sensor data corresponding to the driving conditions. Active lane markers 102 are configured to transmit the sensor data to traffic analysis processor 108 via control center transceiver 110. Traffic analysis processor 108 analyzes the sensor data and based on the analysis transmits guidance data to active lane markers 102 via control center transceiver 110. The guidance data is utilized by the active lane markers 102 to transmit vehicle signals to supported vehicles 112 within an appropriate range of the active lane marker 102. Examples of vehicle signals may include commands to adjust the operation of the vehicle, such as changing direction or changing velocity (including stopping). Other embodiments may comprise additional forms of vehicle signals.

In the depicted embodiment, control center 106 is disposed along the roadway 100, but in other embodiments control center 106 may be located elsewhere without deviating from the teachings of the invention herein. In some embodiments, a network of control centers 106 may be utilized to control a network of active lane markers 102. In some embodiments having a plurality of control centers 106, each control center 106 may be in operable communication with only a portion of the entire network of active lane markers 102. In some embodiments having a plurality of control centers 106, each control center 106 may be in operable communication with the entirety of the network of active lane markers 102. In some embodiments, a single hub control center 106 may be in operable communication with a series of optional repeaters (not shown) to provide communication with active lane markers 102. In the depicted embodiment, control center transceiver 110 is comprised of a single element providing both sending and receiving communication functions, but other embodiments may comprise multiple components operable to performing sending or receiving of communications, including redundant devices each performing one or more of the sending or receiving functions. In the depicted embodiment, control center transceiver 110 utilizes a wireless communication protocol, but other embodiments may comprise a wired operable communication between control center 106 and active lane markers 102. In some embodiments, control center 106 may be operable to acquire data from sources other than active lane markers 102, such as traffic databases, emergency notification systems, government broadcast services, weather information services, or the Internet. In some embodiments, control center 106 may comprise a user interface for traffic analysis processor 108, permitting a user to generate guidance data or to override the guidance data transmitted by control center transceiver 110.

In the depicted embodiment, vehicle 112 is operable to respond to guidance data by changing direction, changing velocity, or coming to a complete stop. Other embodiments of vehicle 112 may comprise other functions instead of, or in addition to, these functions. In some embodiments, vehicle 112 may support different amounts of ADAS control. In some embodiments, the ADAS of vehicle 112 may provide a fully autonomous driving experience for the passengers. In some embodiments, the ADAS of vehicle 112 may provide additional support a driver in abnormal conditions or circumstances, such as icy road conditions or driving in the vicinity of an existing vehicle collision. In some embodiments, the ADAS of vehicle 112 may provide warning indicators and display information useful for navigation, avoiding collision, or the like. In some embodiments, vehicle 112 may have user-adjustable configurations such that a driver of vehicle 112 may control the level of ADAS assistance provided by vehicle 112. In some embodiments, the level of ADAS assistance provided by vehicle 112 may depend upon the physical location of vehicle 112, based upon the availability of local ADAS-supported services, local laws, or other conditions of roadway 100 in a particular location. Other embodiments of vehicle 112 may comprise a combination of some or all of the above implementations of ADAS support.

In some embodiments, the guidance data transmitted by the control center 106 to active lane markers 102 may be in the form of direct ADAS-control commands, but in other embodiments the guidance data may include information useful for an ADAS-supported vehicle. Useful information for an ADAS-supported vehicle may include driving conditions. Driving conditions may comprise traffic conditions or environmental conditions. Traffic conditions are described herein as information pertaining to the vehicles and other users of the roadway, such as proximity and moving velocity of other vehicles, presence of pedestrians, presence of non-motor vehicles, the presence of wild animals, or the like. Environmental conditions are described herein as information pertaining to the environment and physical state of the roadway such as weather patterns, physical condition of the roadway, whether the roadway is under construction, or the like. Some driving conditions of roadway 100 may be characterized as both a traffic condition and an environmental condition, such as the presence of slow-moving construction vehicles within a construction zone, the presence of pedestrians near a school or park, or the like.

Figure 2:
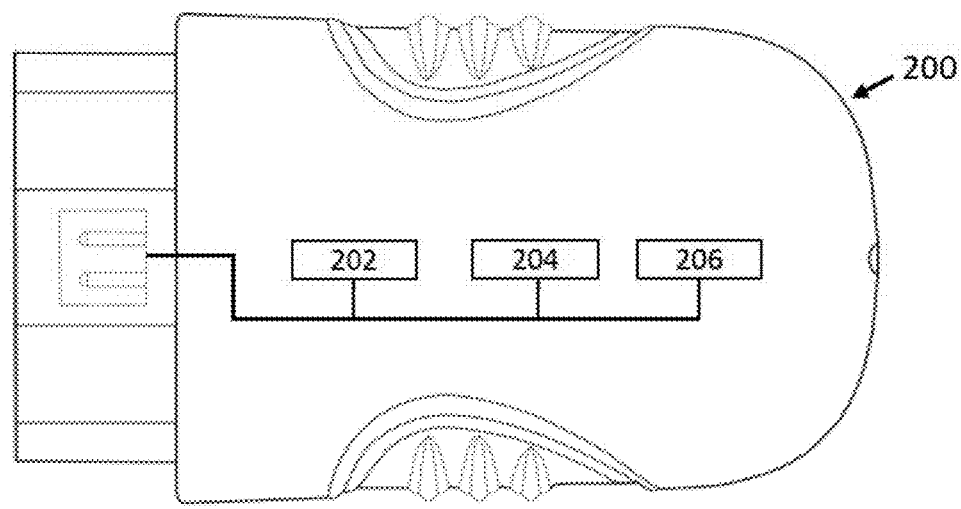
FIG. 2 is a diagrammatic view of an active lane marker device for use within a vehicle guidance system.

In some embodiments, vehicle 112 may be configured to receive guidance data using built-in vehicle components, such as a telematics system, media system, or an electronic control unit (ECU) of vehicle 112. However, older vehicles may not be originally built with appropriate components to interact with active lane markers 102, and instead may be retrofitted with aftermarket components to provide that functionality. FIG. 2 shows an embodiment of an aftermarket dongle 200 that is configured to aid in vehicle compatibility with the systems disclosed herein. In the depicted embodiment, dongle 200 is compatible with an on-board diagnostic (OBD) protocol, but other embodiments may comprise other forms without deviating from the teachings disclosed herein. In some embodiments, dongle 200 may instead be embodied as an aftermarket telematics system, an aftermarket media system, an aftermarket ECU, or any other alternative configuration for providing to a vehicle the functions described without deviating from the teachings disclosed herein.

Dongle 200 comprises a dongle processor 202, a dongle memory 204 and a dongle transceiver 206. Dongle processor 202 is configured to provide operable communication between dongle 200 and the diagnostic port of a vehicle. Dongle memory 204 may comprise data storage for vehicle identification information, vehicle route information, processor-readable instructions usable by diagnostic processor 202, diagnostic logs of vehicle functions, or a data log of received guidance data from active lane markers 102. Dongle transceiver 206 is operable to receive guidance data from active lane markers 102. The guidance data may be stored in dongle memory 204 for later processing, or may be immediately utilized by dongle processor 202 in order to relay the guidance data to the vehicle. In some embodiments, dongle transceiver 206 may also be operable to transmit useful information regarding the status of the vehicle to active lane markers 102, such as vehicle identification, vehicle location, the active moving velocity of the vehicle, data from vehicle sensors, or any other information available to vehicle 112 which may be useful for operation of active lane markers 102 or useful to control center 106 after being relayed by active lane markers 102. In some embodiments, the functions of dongle transceiver 206 may instead be performed by a separate transmitter and receiver disposed within dongle 200.

Figure 3:
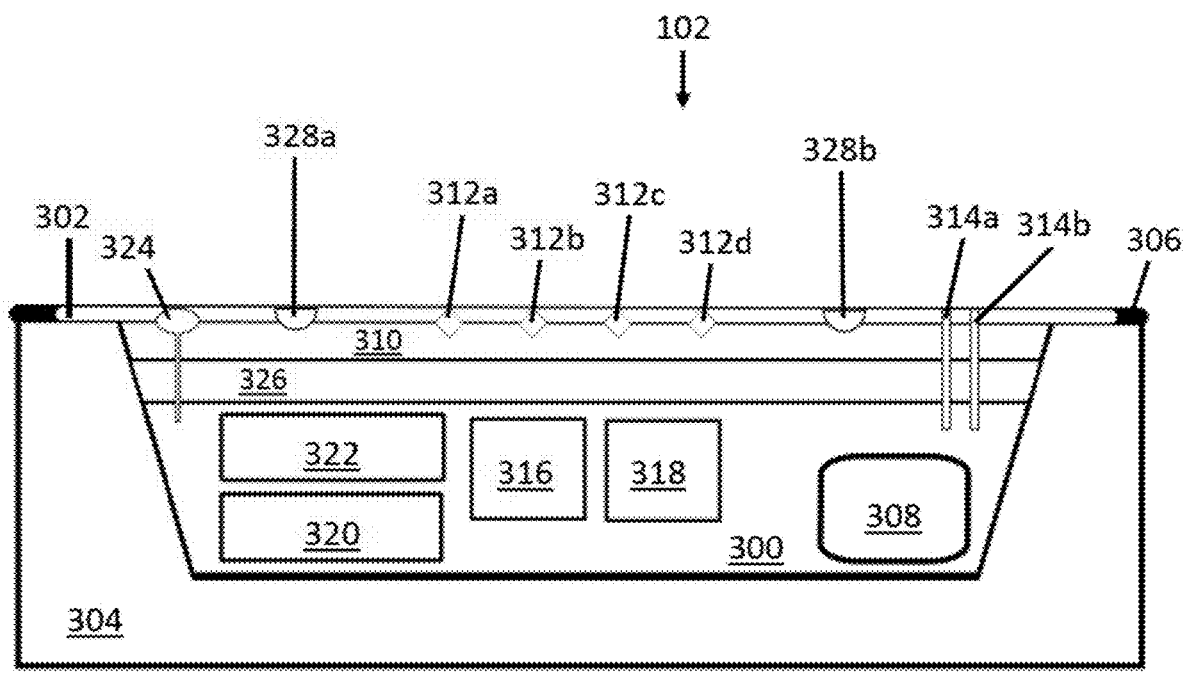
FIG. 3 is a diagrammatic view of a dongle embodiment of a vehicle receiver for use within a vehicle guidance system.

FIG. 3 provides a diagrammatic illustration of the features of an active lane marker 102 according to one embodiment of the teachings disclosed herein. In the depicted embodiment, active lane marker 102 comprises a marker body 300 having a top surface 302. Marker body 300 is configured to be disposed within the road or ground 304 such that top surface 302 is substantially flush with the road surface 306, road surface 306 being the driving surface of roadway 100 (not shown). In the depicted embodiment, top surface 302 is configured to be substantially the same color as a conventional lane marker or other marking of roadway 100 (e.g., white or yellow in accordance with local requirements). The depicted embodiment is a diagrammatic illustration of an active lane marker 102, but may also represent an embodiment of the active lane marker portions of outside lane lines 104.

Disposed within marker body 300 is a power supply 308, operable to provide electrical power to the other components of active lane marker 102. In the depicted embodiment, power source 308 comprises a battery, but other embodiments may comprise other implementations, such as a hard-wired connection to an external power source. Electronically connected to power supply 308 is a solar panel 310 in this shown embodiment. Solar panel 310 is operable to provide electrical power to active lane marker 102 during periods of sufficient sunlight, and further operable to charge power supply 308 for continued operation during periods of insufficient sunlight, such as nighttime. In one embodiment, power supply 308 is operable to power active lane marker 102 for up to 72 hours when at full capacity, but other embodiments may comprise other implementations. In embodiments having a hard-wired connection to an external power source, power supply 308 and solar panel 310 may still be present to provide auxiliary power to active lane marker 102 in case of power failure. In the depicted embodiment, solar panel 310 is operably disposed beneath top surface 302, and top surface 302 is operable to permit passage of sufficient sunlight energize the cells of solar panel 310, but other configurations may be used without deviating from the teachings disclosed herein. In some embodiments, top surface 302 and solar panel 310 may comprise a single component of active lane marker 102. Some embodiments of active lane marker 102 may not comprise solar panel 310.

Active lane marker 102 further comprises a number of traffic sensors 312. Traffic sensors 312 are operable to monitor traffic conditions of roadway 100. In the depicted embodiment, traffic sensors 312 comprise a motion sensor 312a, an acoustic/vibration sensor 312b, a light sensor 312c, and an electromagnetic (EM) sensor 312d, though other embodiments may comprise other forms of traffic sensors 312 instead of, or in addition to, the forms of traffic sensors 312 disclosed herein.

Motion sensor 312a is operable to detect moving objects within the vicinity of active lane marker 102. Motion sensor 312a may advantageously further detect the velocity or direction of moving objects to generate more complete sensor data, which may be utilized to more accurately predict traffic conditions. For example, a fast-moving object moving in substantially the same direction as other fast-moving objects is more likely to be a motor vehicle than a fast-moving object moving in a substantially different direction. Active lane marker 102 may comprise multiple motion sensors 312 disposed at various points within marker body 300. Advantageously, an embodiment having multiple motion sensors may more accurately detect the location and velocity of moving objects. Some embodiments of active lane marker 102 may comprise a plurality of motion sensors, and those embodiments may further comprise motion sensors of varying functionality or specification. Some embodiments of active lane marker 102 may not comprise a motion sensor.

Acoustic/vibration sensor 312b is operable to detect acoustic signals in the atmosphere or vibration signals through the ground 304. Acoustic/vibration sensor 312b may advantageously further detect the spectral content, duration, or acoustic intensity of the acoustic or vibration signals, which may be utilized to more accurately predict traffic conditions. Acoustic/vibration sensor 312 may further advantageously detect both acoustic and vibration signals. For example, a loud, repeating, high-pitched acoustic signal without a strongly-correlated vibration signal is more likely to be a car alarm than a passing truck, while a low-pitched acoustic signal exhibiting Doppler characteristics strongly correlated to a low-frequency vibration signal is more likely to be a passing truck than a car alarm. In some embodiments, the functions of acoustic/vibration sensor 312b may be accomplished using multiple sensors disposed advantageously at different within marker body 300. For example, an acoustic-only sensor may have optimal sensitivity and accuracy being disposed near top surface 302 (see FIG. 3), where the acoustic vibrations of the outside environment are more likely to penetrate marker body 300. Conversely, a vibration-only sensor may have optimal sensitivity and accuracy being disposed away from top surface 302, and closer to a surface of marker body 300 in direct contact with ground 304. In some embodiments, active lane marker 102 may only comprise an acoustic-only version sensor or a vibration-only version of the sensor. Some embodiments of active lane marker 102 may comprise a plurality of acoustic/vibration sensors, and those embodiments may further comprise acoustic/vibration sensors of varying functionality or specification. Some embodiments of active lane marker 102 may not comprise any form of an acoustic/vibration sensor.

Light sensor 312c is operable to detect light emissions in the environment of active lane marker 102. Light sensor 312c may advantageously further detect the spectral content, duration, intensity of light emissions, or differential changes in the light emissions, which may be utilized to more accurately predict traffic conditions. The environment may be subjected to relatively static lighting conditions, such as natural sunlight or static artificial lighting to illuminate roadway 100 at night. For example, a change in spectral content and drop in light intensity at a rate substantially faster than normally-observed rates may indicate a moving object, such as a vehicle, moving into the proximity of light sensor 312c such that it at least partially blocks the surrounding light emissions. Similarly, a change in spectral content and an increase in light intensity at a rate substantially faster than normally-observed rates may indicate an approaching vehicle with active headlights. Some embodiments of active lane marker 102 may comprise a plurality of light sensors, and those embodiments may comprise light sensors of varying functionality or specification. Some embodiments of active lane marker 102 may not comprise a light sensor.

Electromagnetic (EM) sensor 312d is operable to detect EM emissions in the environment of active lane marker 102. EM emissions may be utilized by vehicles within roadway 100 to assist in ADAS functions of other vehicles, or to interact with the environment. EM sensor 312d may advantageously further detect the spectral content, duration, or intensity of EM emissions, which may be utilized to more accurately predict traffic conditions or to interpret a greater variety of EM signals. By way of example and not limitation, emergency response vehicles may be configured to emit an EM signal in the form of a traffic light preemption signal when the siren is active. Thus, when the emergency response vehicle is traveling to the site of an emergency, the traffic light preemption signal is broadcast by the vehicle. Compatible traffic lights can then detect the preemption signal and change states to prevent cross-traffic from entering intersections. EM sensor 312d may be configured to detect existing traffic light preemption signals, or to detect other proprietary emergency vehicle signals. Other embodiments may further be directed to other forms of EM emissions, such as consumer vehicles emitting EM presence signals to assist ADAS functions of other vehicles. Some embodiments of lane marker 102 may comprise a plurality of EM sensors, and those embodiments may comprise EM sensors of varying functionality or specification. Some embodiments of active lane marker 102 may not comprise an EM sensor.

Active lane marker 102 further comprises a number of environmental sensors 314. Environmental sensors 314 are operable to monitor the environmental conditions of roadway 100. In the depicted embodiment, environmental sensors 314 comprise an ice sensor 314a and a pollution sensor 314b, though other embodiments may comprise other forms of environmental sensors 314 instead of, or in addition to, the forms of environmental sensors 314 disclosed herein.

Ice sensor 314a comprises a temperature probe operable to monitor the temperature of active lane marker 102 at top surface 302. Because top surface 302 is substantially flush with road surface 306, the temperature of top surface 302 may be substantially similar to the temperature of road surface 306. Low temperatures nearing or below 0° C. may experience adverse icy conditions on road surface 306. Ice sensor 314a may also an optical probe operable to detect changes in optical opacity or changes in refractive index when light is reflected off top surface 302. Changes in opacity or refractive index at sufficiently low temperatures may indicate the formation of ice on top surface 302. Some embodiments may comprise multiple ice sensors, and those embodiments may comprise ice sensors of varying functionality or specification. Some embodiments of active lane marker 102 may not comprise an ice sensor.

Pollution sensor 314b is operable to detect particulates and emissions common to combustion engines of motor vehicles in the environment of active lane marker 102, which may be utilized to more accurately predict traffic conditions. For example, pollution sensor 314b detecting pollution at elevated levels may be an indication of heavy traffic or traffic congestion. Additionally, some municipalities may have temporary or permanent pollution restrictions, and active lane marker 102 may detect vehicles that are operating outside of the required conditions. Some embodiments of active lane marker 102 may comprise multiple pollution sensors, and those embodiments may comprise pollutions sensors of varying functionality or specification. Some embodiments of active lane marker 102 may not comprise an ice sensor.

The traffic sensors 312 and environmental sensors 314 of active lane marker 102 are utilized to generate sensor data for transmission to control center 106. Active lane marker 102 further comprises a marker processor 316, marker memory 318, marker transmitter 320, and marker receiver 322 to enable operable communication between active lane marker 102 and control center 106. Marker processor 316 may be configured to collect from traffic sensors 312 and environmental sensors 314 and assemble a set of sensor data for transmission to control center 106. The sensor data may comprise raw data from the sensors reflecting the driving conditions, or marker processor 316 may perform partial or complete analysis of the raw data to be transmitted to control center 106. In the depicted embodiment, the sensor data comprises raw data to be analyzed by traffic analysis processor 108, which advantageously reduces the power requirements of marker processor 316. The data reported by the traffic sensors 312 or environmental sensors 314 may be stored in marker memory 318 as data logs. Marker memory 318 may further store instructions operable to be executed by marker processor 316. Marker memory 318 may further store identification information for the active lane marker 102, such as positional data, an identification number for use within a network of active lane markers 102, installation/maintenance records, or version information for any software instructions or firmware embodied within active lane marker 102. In the depicted embodiment, marker processor 316 is a specialized processor device, but other embodiments may comprise a general-purpose processing device operable to execute software instructions, a general-purpose processing device operable to execute firmware instructions, a digital signal processor having internal instructions, a field-programmable gate array, or any other equivalent alternative configuration known to one of ordinary skill in the art. In the depicted embodiment, marker memory 318 comprises a flash memory, but other embodiments may comprise a hard disk drive, random-access memory (RAM), programmable memory (PROM), electronic programmable memory (EPROM), secure digital (SD) card, or any other alternative configuration known to one of ordinary skill in the art without deviating from the teachings disclosed herein.

Marker transmitter 320 is operable to transmit the sensor data to control center 106. Marker transmitter 320 may be configured to transmit sensor data provided by marker processor 316, or stored by marker memory 318. In response to receiving sensor data transmitted by marker transmitter 320, traffic analysis processor 108 generates guidance data in response to the sensor data that is then transmitted by control center 106 and received by marker receiver 322. The guidance data may comprise operational instructions for active lane marker. Active lane marker 102 is configured to respond to the guidance data according to the operational instructions. Operational instructions may include instructions for active lane marker 102 to transmit vehicle signals, which are detectable by vehicles 112 in roadway 100. In the depicted embodiment, the active lane marker 102 transmits vehicle signals using marker transmitter 322, but other embodiments may have other implementations with a distinct transmitter. Vehicle signals may comprise information useful for an ADAS-supported vehicle 112, or direct commands to control ADAS-supported vehicle 112. In some embodiments the vehicle signals may be included within the guidance data transmitted from control center 106, with active lane marker 102 acting as a repeater of the vehicle signal. In some embodiments, the vehicle signals may be encoded within the guidance data transmitted from control center 106, with active lane marker 102 decoding the vehicle signals before transmission. In some embodiments, the vehicle signals comprise a set of pre-determined commands stored in marker memory 318, to be accessed and selected by marker processor 316. In some embodiments, marker processor 316 may generate vehicle signals based upon the contents of the guidance data received by marker receiver 322. The vehicle signals generated by marker transmitter 320 may have an active range that is controllable based upon detected traffic conditions. For example, in faster-moving traffic, the marker transmitter 320 may be configured to transmit vehicle signals with more power and greater range in order to optimize the reaction times of drivers of vehicles. In some embodiments, the transmission power of marker transmitter 320 may be correlated to the type of signal for transmission. For example, sensor data may be transmitted at a higher power in order to reach a distant control center, while vehicle signals may be transmitted at a lower power to optimize reception by ADAS -supported vehicles.

In the depicted embodiment, active lane marker 102 further comprises an antenna 324 to optimize transmission and reception of signals by marker transmitter 320 and marker receiver 324. In some embodiments, active lane marker 102 may not comprise an antenna. In the depicted embodiment, active lane marker 102 comprises a distinct marker transmitter 320 and marker receiver 322 but other embodiments may comprise a single marker transceiver that is operable to perform all the functions of marker transmitter 320 and marker receiver 322.

Active lane marker 102 may further comprise other features. In the depicted embodiment, active lane marker 102 further comprises a heating element 326. Heating element 326 is powered by power source 308 and is operable to raise the temperature of top surface 302 above a threshold temperature. In some embodiments, the threshold temperature may be 0° C. to prevent formation of ice on top surface 302, but other embodiments may use alternative threshold temperatures without deviating from the teachings disclosed herein. In the depicted embodiment, heating element 326 may be activated and deactivated in response to additional data acquired by active lane marker 102. In some embodiments, heating element 326 may be activated only when environmental sensors 314 indicate that formation of ice on top surface 302 is occurring. In some embodiments, heating element 326 may be activated in response to guidance data received from control center 106 that includes a command to activate heating element 326.

In the depicted embodiment, active lane marker 102 further comprises a number of indicators 328. Indicators 328 are operable to provide vehicle-recognizable or human-recognizable indications, such as electromagnetic transmissions, visual lights, or audible sounds. In the depicted embodiment, light-emitting diode (LED) indicators 328a comprise an LED operable to provide static or dynamic light displays. In the depicted embodiment, LED indicators 328 are operable to provide illumination of active lane marker 102 in a number of different colors to help provide visual indication of traffic conditions to drivers of motor vehicles, including motor vehicles lacking ADAS -supported functions. In one exemplary embodiment, active lane marker 102 is operable to illuminate LED indicators 328a in a bright yellow color to match the passive color of top surface 302 while providing a higher visibility. If environmental sensors 314 indicate heavy fog conditions, or if control center 106 receives data indicating such conditions, along roadway 100, active lane marker 102 may illuminate LED indicators 328a in order to visually indicate the lane positions within roadway 100 for a driver.

In the depicted embodiment, active lane marker 102 further comprises a presence indicator 328b. Presence indicator 328b is operable to continuously emit a short-range electromagnetic signal used by vehicles to detect the bounds of lanes on a roadway. In the depicted embodiment, the emitted signals of presence indicator 328b further comprises identification information for active lane marker 102, such as the position of the active lane marker 102 with respect to roadway 100 (i.e., which lanes of the roadway are bounded by the active lane marker 102), the direction of traffic (e.g., Northbound, Southbound, etc.), the network address of the active lane marker 102, or the distance between the active lane marker 102 and the adjacent lane markings. In some embodiments, the functions of presence indicator 328b may instead be performed by marker transmitter 320. In the depicted embodiment, presence indicator 328b may advantageously comprise a passive implementation, such as an RFID tag, which advantageously results in lower power consumption than continuous active transmission by marker transmitter 320. A presence indicator 328b may comprise other embodiments known to one of ordinary skill in the art without deviating from the teachings disclosed herein. Presence indicator 328b may further have a shorter transmission range than marker transmitter 320. A shorter transmission range is advantageous because it further reduces power consumption requirements of active lane marker 102, while also only providing presence data in vehicle signals that are within a desired proximity to the active lane marker 102. Thus, because presence indicator signals are only discoverable within a shortened range within proximity of active lane marker 102, a vehicle driving along roadway 100 will only need to receive and interpret vehicle signals transmitted from active lane markers 102 that are near enough to the vehicle to be of utility to the ADAS.

Active lane marker 102 may comprise other embodiments having other forms of indicators 328 instead of, or in addition to, the embodiments depicted. Such other alternative embodiments may comprise alternative light-based indicators, but may also comprise sound-emitters, radio-frequency emitters, infrared emitters, or any other equivalent embodiment known to one of ordinary skill in the art without deviating from the teachings disclosed herein.

Figure 4:
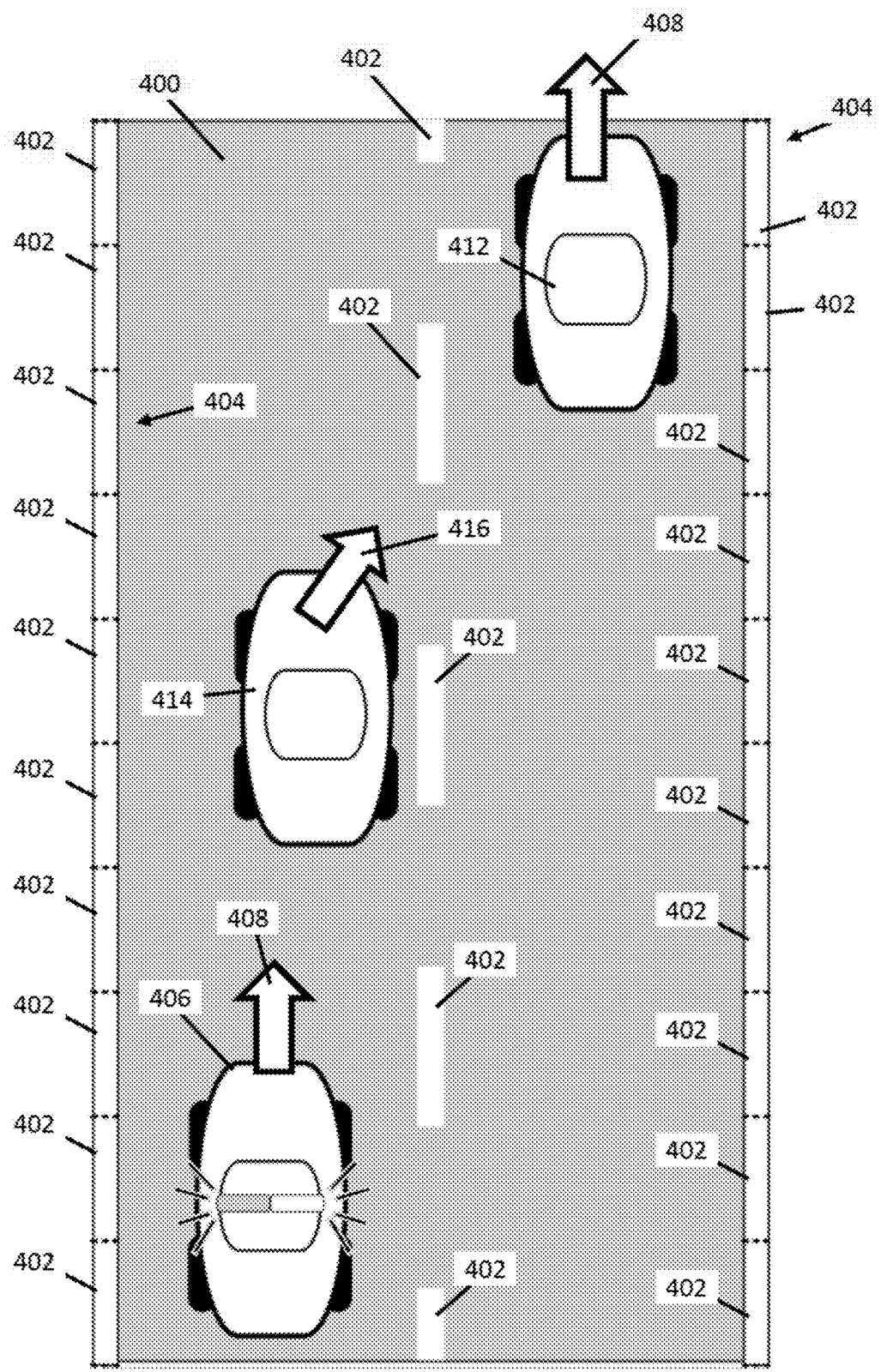
FIG. 4 is a diagrammatic illustration of a first exemplary embodiment of a vehicle guidance system.

FIG. 4 provides a diagrammatic illustration of an exemplary embodiment used according to one function of the teachings disclosed herein. FIG. 4 depicts a roadway 400 having a network of active lane markers 402, with outer lane lines 404 also comprised of active lane markers 402. The active lane markers 402 and comprising outer lane lines 404 comprise one embodiment of an active lane marker as disclosed above with respect to FIG. 3.

In the depicted embodiment, an emergency response vehicle 406 is traveling in a fast-moving lane of roadway 400 in a direction 408 with an emergency signal active. Active lane markers 402 gather sensor data that indicates the conditions of an emergency vehicle using traffic sensors 312 and environmental sensors 314. Traffic sensors 312 (see FIG. 3) include an EM sensor 312d (see FIG. 3), which receives a traffic light preemption signal from emergency response vehicle 406. Traffic sensors 312 may also include an acoustic/vibration sensor 312b (see FIG. 3), which detects the acoustic signal created by the siren of emergency response vehicle 406. The sensor data is transmitted to a control center 106 (see FIG. 1) via marker transmitter 320 (see FIG. 3), wherein a traffic analysis processor 108 (see FIG. 1) provides an optimal traffic pattern comprised of civilian vehicles traveling in direction 408 at a reduced speed in only the slow-moving lane of roadway 400. The control center transmits the guidance data to active lane markers 402, and each marker processor 316 (see FIG. 3) generates vehicle signals directing ADAS -supported vehicles to conform to the optimal traffic pattern. A first vehicle 412 supporting ADAS functions is already traveling in direction 408 in the slow-moving lane, but at a faster velocity than is determined to be optimal. In response, first vehicle 412 persists in its current direction and lane position, but reduces its velocity. A second vehicle 414 supporting ADAS functions is traveling in direction 408 in the fast-moving lane and at a faster velocity than the optimal velocity. In response, second vehicle 414 must change course to direction 416 until second vehicle 414 has successfully changed lanes into the slow-moving lane. At the same time that second vehicle 414 is changing lanes, it also reduces velocity to conform to the optimal traffic patterns in a safe manner Once second vehicle 414 has completed the lane change, it resumes traveling in direction 408. These actions create a safe traffic pattern permitting emergency response vehicle 406 to pass in the fast-moving lane unimpeded. When emergency response vehicle 406 is no longer within range of the sensors of active lane markers 402, the active lane markers will resume providing sensor data indicated routine driving conditions, and the control center will no longer transmit guidance data corresponding to the presence of an emergency response vehicle. Thus, operation of the ADAS-supported vehicles will resume to their states prior to the presence of emergency response vehicle 406. The depicted embodiment comprises fully-autonomous ADAS-support for each of first vehicle 412 and second vehicle 414, but other embodiments having different compatibility may instead only partially control the functions of a vehicle, or may simply provide driver indications of the optimal traffic pattern.

Figure 5:
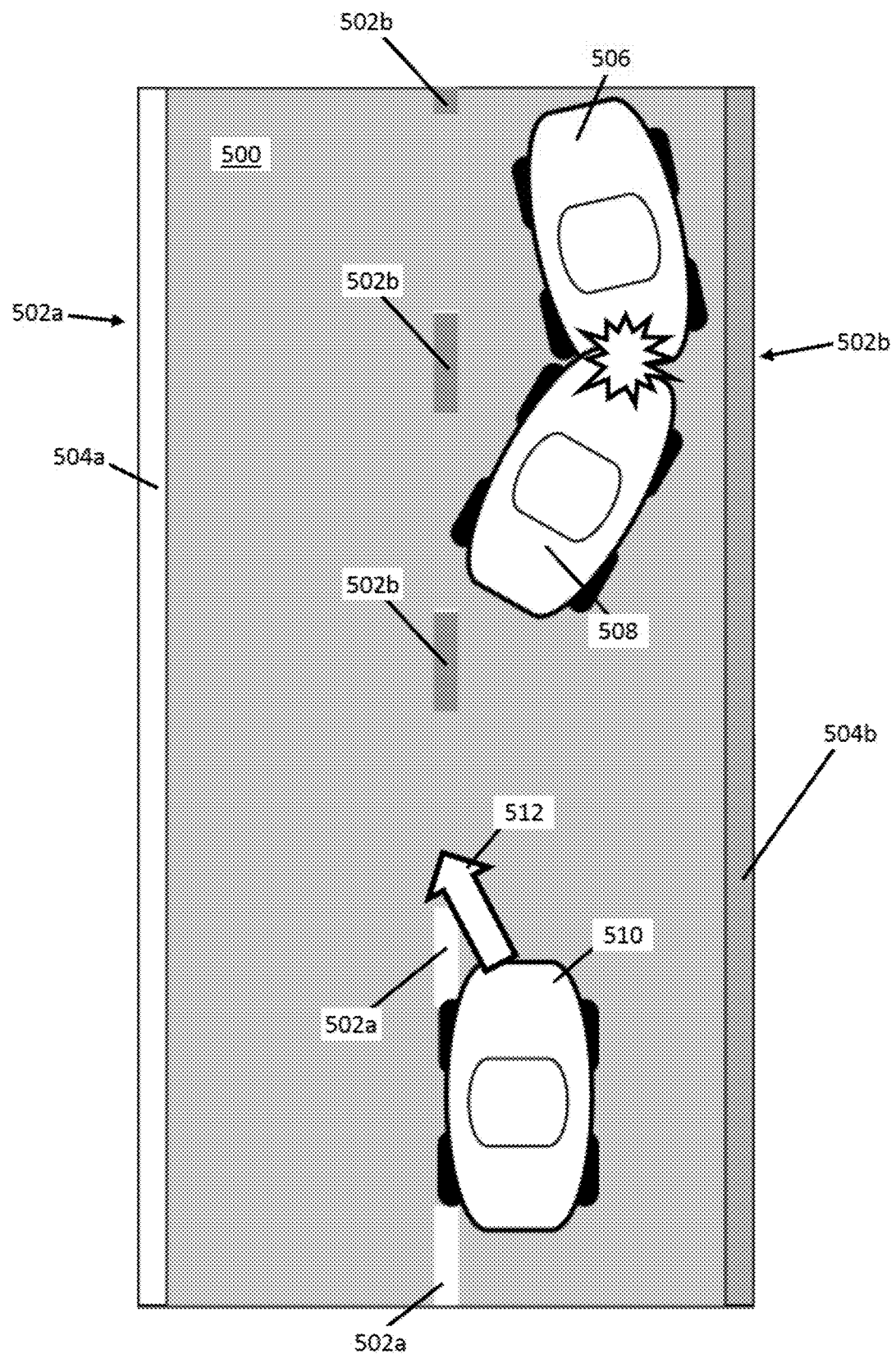
FIG. 5 is a diagrammatic illustration of a second exemplary embodiment of a vehicle guidance system.

FIG. 5 is a diagrammatic illustration of another exemplary embodiment of the teachings herein. FIG. 5 depicts a roadway 500 having a network of active lane markers 502, with outer lane lines 504 also comprised of active lane markers 502. In this depicted embodiment, outer lane lines 504 comprise substantially contiguous active portions, with no conventional passive lines. The lane markings depicted herein comprise active lane markers 502 and outer lane lines 504 according to one embodiment of an active lane marker as disclosed above with respect to FIG. 3. In the depicted embodiment, active lane markers 502a and outer lane lines 504a designate lane markings wherein their respective LED indicators 328 (see FIG. 3) are currently inactive. Because the respective LED indicators 328 are inactive, the respective lane markings have their conventional appearance (e.g., yellow). In the depicted embodiment, active lane markers 502b and outer lane lines 504b designate lane markings wherein their respective LED indicators 328 (see FIG. 3) are currently active. Because of the active state of the respective LED indicators, these respective lane markings are given an altered appearance (e.g., flashing between illuminated red and yellow).

In the depicted embodiment of FIG. 5, the illuminated lane markings 502b and 504b are illuminated in response to detection of an abnormal status. The abnormal status depicted is a first vehicle 506 and a second vehicle 508 stopped in a right-hand lane of the roadway 500. First vehicle 506 and second vehicle 508 may have collided or have another service need and remain unmoving while blocking a portion of one lane of roadway 500. In the depicted embodiment, first vehicle 506 or second vehicle 508 may each be ADAS-supported such that they transmit a distress signal indicating a collision, service need, or unmoving status. The distress signal may be received by marker receivers 322 (see FIG. 3) of the surrounding lane markings, and lane markings 502 and 504 may utilize the signals to determine the presence of stopped traffic within the lane. However, even if neither first vehicle 506 nor second vehicle 508 have ADAS-supported functions, the traffic sensors 312 and environmental sensors 314 (see FIG. 3) of active lane markers 502 and outer lane lines 504 could detect the presence of unmoving objects. Active lane markers 502 and outer lane lines 504 then transmit the sensor data to a control center 106 for traffic analysis by a traffic analysis processor 108 (see FIG. 1). The control center then transmits guidance data to active lane markers 502 and outer lane lines 504. The transmitted guidance data identifies active lane markers 502b and outer lane lines 504b specifically in order to include commands for those lane markings to illuminate their respective LED indicators 328a (see FIG. 3). The same guidance data does not identify active lane markers 502a or outer lane lines 504a, so those lane markings do not illuminate their respective LED indicators 328a. Active lane markers 502b and outer lane lines 504b are explicitly identified and chosen for these commands based upon their proximal relation to the location of the collision. Outer lane line 504b is disposed upstream of traffic in the right-hand lane, the same lane as the detected collision, giving drivers of vehicles without ADAS-supported functions advance notice of a hazardous traffic condition. When the proximity of the collision is lower than a threshold distance, active lane markers 502b also illuminate, to indicate to the driver of a vehicle to leave the lane of obstruction. In the depicted embodiment, lane markings 502b and 504b do not only illuminate LED indicators 328a, but also transmit vehicle signals to merge left into the unobstructed lane. In the depicted embodiment, a third vehicle 510 having ADAS-supported functions is driving upstream of the collision in the same lane. Third vehicle 510 receives the lane-change vehicle signals from the outer lane lines 504b at a safe distance from the site of the stopped vehicles, and begins veering to direction 512 to change lanes away from the obstructing condition. After shifting into the unobstructed lane, third vehicle 510 continues driving with the flow of traffic. Near the site of the collision, active lane markers 502b continue transmitting vehicle signals indicating an unsafe condition in the right-hand lane, and also instructing third vehicle 510 to remain in the left-hand lane. These vehicle signals are persistently transmitted by active lane markers 502b and outer lane line 504b until the flow of traffic has advanced far enough downstream of the collision that it is again safe to utilize the right-hand lane. In the depicted embodiment, if the stopped vehicles obstructed all lanes of roadway 500, the vehicle signals may comprise commands to direct third vehicle 510 to come to a complete stop. Such vehicle signals may persist until such time that the sensors of the lane markings indicate that at least one lane of roadway 500 is safe enough to continue driving.

These depictions are intended to provide illustration and not limitation to the teachings disclosed herein. One of ordinary skill in the art will recognize additional or alternative scenarios or environments that are applicable to the teachings herein without deviating from the disclosure provided. Alternative embodiments may comprise alternative vehicles, including mass transit automobiles, shipping automobiles, railway cars, monorail cars, maglev vehicles, or any other ground-based vehicles having partially-assisted or fully-autonomous functions.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle guidance system comprising:
a control center having a traffic analysis processor operable to receive sensor data and configured to transmit guidance data;
a number of active lane markers configured to be disposed along lanes of a road, the number of active lane markers in operable communication with the control center. each active lane marker having a number of sensors operable to monitor environmental conditions or traffic conditions of the road, generate the sensor data corresponding to the environmental conditions or traffic conditions, and transmit the sensor data to the traffic analysis processor, and each achye lane marker further operable to receive the guidance data and transmit vehicle signals to vehicles within a range of the active lane marker; and
a number of vehicle receivers, each of the number of vehicle receivers operably coupled to a vehicle, the number of vehicle receivers being operable to receive the vehicle signals, the vehicle signals providing vehicle data for driver assistance functions of the vehicle,
wherein the number of active lane markers further comprise a heatin element. operable to raise the temperature of a top surface of the active lane marker, the top surface being disposed such that it is substantially flush with a driving surface of the road.

2. The vehicle guidance system of claim 1. wherein the number of vehicle receivers are embodied as a dongle that is operably coupled to the vehicle using a diagnostic port of the vehicle.

3. The vehicle guidance system of claim 1, wherein the number of active lane markers further comprise a temperature probe operable to measure the temperature of the top surface of the active lane marker.

4. A vehicle guidance system comprising:
a control center having a traffic analysis processor operable to receive sensor data and configured to transmit guidance data; and
a number of active lane markers configured to be disposed along lanes of a road, the number of active lane markers in operable communication with the control center, each active lane marker having a number of sensors operable to monitor environmental conditions and traffic conditions, generate the sensor data corresponding to the environmental conditions and traffic conditions, and transmit the sensor data to the traffic analysis processor, each active lane marker further operable to receive the guidance data and transmit vehicle signals to vehicles within a range of the active lane marker, and each active lane marker further comprises a heating element operable to raise the temperature of a top surface of the active lane marker, the top surface being disposed such that it is substantially flush with a driving surface of the road.

5. The vehicle guidance system of claim 4, wherein the vehicle signals comprise vehicle data for driver assistance functions of a vehicle.

6. The vehicle guidance system of claim 4, wherein the number of active lane markers are in operable coin nication with the control center via a wireless connection to the traffic analysis processor, the wireless connection being operable to send and receive data between the active lane marker and the traffic analysis processor.

7. An active lane marker device configured to be disposed along the lanes of a road, the device comprising;
a power supply disposed within the active lane marker device;
a number of sensors, each connected to the power supply, operable to monitor environmental conditions or traffic conditions of the road and to generate corresponding sensor data, the number of sensors comprising a temperature sensor operable to measure the temperature of a top surface of the active lane marker;
a control transmitter connected to the power supply and in communication with the number of sensors, the control transmitter operable to transmit the sensor data to a control processor;
a control receiver connected to the power supply and operable to receive guidance data from the control processor;
a vehicle transmitter connected to the power supply and operable to transmit vehicle data corresponding to the guidance data received from the control processor to vehicles within a. range of the vehicle transmitter; and
heating element disposed along the top surface of the active lane marker device, the heating element operable to raise the temperature of the top surface of the active lane marker.

8. The active lane marker device of claim 7, wherein the power supply comprises a. battery.

9. The active lane marker device of claim 8, wherein the power supply further comprises a. solar panel, the solar panel being operable to charge the battery.

10. The active lane marker device of claim 7, wherein the number of sensors comprise a motion sensor operable to detect movement of vehicles in the road.

11. The active lane marker device of claim 10, wherein the motion sensor is further operable to measure the velocity of vehicles in the road..

12. The active lane marker device of claim 7, wherein the number of sensors comprises a first-responder sensor operable to detect an emergency vehicle engaging in active emergency response.

13. The active lane marker device of claim 7, wherein the number of sensors comprises a motion sensor operable to detect movement of vehicles in the road and a temperature sensor operable to measure the temperature of a top surface of the active lane marker, the top surface of the active lane marker being disposed such that it is substantially flush with the driving surface of the road.

14. The active lane marker device of claim 13, wherein the number of sensors comprises a first-responder sensor operable to detect an emergency vehicle engaging in active emergency response.

15. The active lane marker device of claim 7, further comprising a persistent memory operable to store data comprising a device identification information for the active lane marker.

16. The active lane marker device of claim 7, wherein the control transmitter comprises a. wireless transmitter.

17. The active lane marker- device of claim 7, wherein the control transmitter and the vehicle transmitter comprise a single transmitter operable to transmit both the sensor data to the control processor and the vehicle data to corresponding to the guidance data to vehicles within a range of the single transmitter.

* * * * *

UNITED STATES PATENT AND TRADEMARK OFFICE
CERTIFICATE OF CORRECTION

PATENT NO. : 11,288,959 B2
APPLICATION NO. : 16/759899
DATED : March 29, 2022
INVENTOR(S) : Zack It is certified that error appears in the above-identified patent and that said Letters Patent is hereby corrected as shown below:

In the Claims

In Claim 1:
At Column 13, Lines 8-9: "the control center. each active lane marker" should read --the control center, each active lane marker--;
At Column 13, Line 14: "achye" should read --active--; and
At Column 13, Line 25: "a heatin element. operable" should read --a heating element operable--.

In Claim 2:
At Column 13, Line 29: "claim 1. wherein" should read --claim 1, wherein--.

In Claim 6:
At Column 13, Line 61: "coin nication" should read --communication--.

In Claim 7:
At Column 14, Line 2: "comprising;" should read --comprising:--; and
At Column 14, Line 21: "a. range" should read --a range--.

In Claim 8:
At Column 14, Line 27: "a. battery" should read --a battery--.

In Claim 9:
At Column 14, Line 29: "a. solar panel" should read --a solar panel--.

In Claim 11:
At Column 14, Line 37: "the road.." should read --the road.--.

In Claim 16:
At Column 14, Line 58: "a. wireless transmitter" should read --a wireless transmitter--.

Signed and Sealed this
Second Day of August, 2022

Katherine Kelly Vidal
*Director of the United States Patent and Trademark Office*

In Claim 17:
At Column 14, Line 59: "lane marker-device" should read --lane marker device--.